(12) United States Patent
Dong

(10) Patent No.: US 7,363,241 B1
(45) Date of Patent: Apr. 22, 2008

(54) TICKET BOOKING AND ISSUING SYSTEM AND METHOD FOR THE SAME

(75) Inventor: Wuping Dong, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/458,820

(22) Filed: Dec. 13, 1999

(30) Foreign Application Priority Data

May 24, 1999 (JP) ................................. 11-142682

(51) Int. Cl.
*G06Q 10/00* (2006.01)
(52) U.S. Cl. .......................................... 705/5; 705/26
(58) Field of Classification Search ................ 701/201; 345/763; 705/5, 6, 8, 14, 26, 80; 713/202; 235/383, 472.02; 707/1, 3, 10; 709/224
See application file for complete search history.

(56) References Cited

U.S. PATENT DOCUMENTS

| | | | | |
|---|---|---|---|---|
| 4,862,357 A | * | 8/1989 | Ahlstrom et al. ............... | 705/6 |
| 5,021,953 A | * | 6/1991 | Webber et al. .................. | 705/6 |
| 5,237,499 A | * | 8/1993 | Garback ......................... | 705/5 |
| 5,422,809 A | * | 6/1995 | Griffin et al. ................... | 705/5 |
| 5,570,283 A | * | 10/1996 | Shoolery et al. ................ | 705/5 |
| 5,732,398 A | * | 3/1998 | Tagawa ........................... | 705/5 |
| 5,781,892 A | * | 7/1998 | Hunt et al. ...................... | 705/5 |
| 5,832,451 A | * | 11/1998 | Flake et al. ..................... | 705/5 |
| 5,832,454 A | | 11/1998 | Jafri et al. | |
| 5,842,176 A | * | 11/1998 | Hunt et al. ...................... | 705/5 |
| 5,948,040 A | * | 9/1999 | DeLorme et al. ............. | 701/201 |
| 6,018,715 A | * | 1/2000 | Lynch et al. .................... | 705/5 |
| 6,091,823 A | * | 7/2000 | Hosomi et al. .............. | 380/211 |
| 6,266,648 B1 | * | 7/2001 | Baker, III ...................... | 705/14 |
| 6,269,369 B1 | * | 7/2001 | Robertson ..................... | 707/10 |
| 6,324,517 B1 | * | 11/2001 | Bingham et al. ............... | 705/8 |
| 6,356,874 B1 | * | 3/2002 | Øhrn ............................. | 705/26 |

(Continued)

OTHER PUBLICATIONS

Bloch, M. et al. "The Impact of Electronic Commerce on the Travel Industry" Jun. 1996. [Retrieved from Internet Aug. 7, 2006]. URL: <http://groups.haas.berkeley.edu/citm/publications/papers/wp-1017.html>.*

(Continued)

*Primary Examiner*—C. Luke Gilligan
*Assistant Examiner*—Natalie A. Pass
(74) *Attorney, Agent, or Firm*—Rabin & Berdo, PC

(57) ABSTRACT

A ticketing method that permits a plane ticket or the like to be easily obtained via an in-house system. A ticket booking service request is sent to a net server from a PC through a LAN. Then, an airline company selection screen is sent from the net server to the PC in response. When an airline company is selected from among the airlines displayed on the PC, a connection is established to a ticket reservation system of the selected airline company through the Internet. Data for the ticket booking is sent to the net server from the PC. The ticket booking data is sent to a ticket booking and issuing terminal from the net server, and then to the reservation system through a dedicated line. The booked ticket is issued from a ticket issuing printer on the basis of the ticket issuing data supplied from the reservation system.

6 Claims, 5 Drawing Sheets

U.S. PATENT DOCUMENTS

| | | | |
|---|---|---|---|
| 6,360,205 B1 * | 3/2002 | Iyengar et al. | 705/5 |
| 6,412,073 B1 * | 6/2002 | Rangan | 713/202 |
| 6,442,526 B1 * | 8/2002 | Vance et al. | 705/5 |
| 6,526,426 B1 * | 2/2003 | Lakritz | 715/536 |
| 6,609,658 B1 * | 8/2003 | Sehr | 235/384 |
| 6,937,991 B1 * | 8/2005 | Zompa et al. | 705/5 |
| 2003/0154169 A1 * | 8/2003 | Yanai | 705/65 |

OTHER PUBLICATIONS

Travelocity website. Jun. 1997. [Retr. Mar. 28, 2007]. Retrieved fr.Internet: URLs: <http://web.archive.org/web/19970622100501/www.travelocity.com/>, <http://web.archive.org/web/19970203080121/www.sabre.com/>, <http://web.archive.org/web/19961028011809/www.americanair.com/aa_home.htm>.*

* cited by examiner

FIG. 4

| | |
|---|---|
| SELECT AIRLINE COMPANY, A HOME PAGE OF THE COMPANY IS DISPLAYED IN THE RIGHT FRAME<br><br>    A AIRLINES<br>    B AIRLINES<br>    C AIRLINES<br>    D AIRLINES | AUGUST 10TH FLIGHT NUMBER : AAL1111<br>                ACCEPTANCE NUMBER : 123456<br>AUGUST 15TH FLIGHT NUMBER : AAL2222<br>                ACCEPTANCE NUMBER : 111112<br><br>NAME: YAMADA/TAROU MR<br>YOUR TICKET BOOKING ACCEPTED.<br><br>\* \* THANK YOU VERY MUCH \* \* |

\* \* FOR REQUESTING A TICKET ISSUE AFTER BOOKING, \* \*
\* \* PLEASE PRESS TRANSFER BUTTON.
      NOTICE : TRANSFER BUTTON SHOULD NOT BE PRESSED BEFORE BOOKING.

( TRANSFER )
( RETURN )

TICKET BOOKING PROCESS SCREEN

FIG. 5

```
                    TICKET ISSUE
               * * REQUEST    * *
                    INFORMATION
NAME: TAROU YAMADA
REQUESTED TIME FOR DISPATCH : AUGUST 8TH AROUND 16:00
ACCEPTANCE NUMBER 1 : 123456
DEPARTURE DATE : AUGUST 10TH, 1997
FLIGHT NUMBER : AAL1111
ACCEPTANCE NUMBER 2 : 111112
DEPARTURE DATE : AUGUST 15TH, 1997
FLIGHT NUMBER : AAL2222
ACCEPTANCE NUMBER 3
DEPARTURE DATE :
FLIGHT NUMBER :
 IN CASE ONE ACCEPTANCE NUMBER IS USED TO BOOK FLIGHTS FOR A
ROUND TRIP, DEPARTURE DATES AND FLIGHT NUMBERS ARE DISPLAYED
ONLY FOR ONE WAY OF EITHER GOING OR RETURNING. IN CASE TICKET
BOOKING INFORMATION DISPLAYED ON THE TICKET BOOKING
ACCEPTANCE SCREEN IS NOT DISPLAYED IN THE TICKET ISSUING
REQUEST INFORMATION, PLEASE INPUT THE TICKET ISSUING REQUEST
 INFORMATION, THOUGH WE ARE SORRY TO TROUBLE YOU.
 IN CASE YOU DIDN'T DESIGNATE THE REQUESTED TIME FOR DISPATCH,
YOU WOULD GET THE TICKETS BY AUGUST 9TH.
           PLEASE CLICK IF YOU REQUEST A TICKET ISSUE
                    (TICKET ISSUE REQUEST)
```

TICKET ISSUING PROCESS SCREEN

_US 7,363,241 B1_

TICKET BOOKING AND ISSUING SYSTEM AND METHOD FOR THE SAME

BACKGROUND OF THE INVENTION

1. Field of the Invention

The present invention relates to a ticket booking and issuing system and a method for the system, and in particular, relates to a ticket booking and issuing system and the method for making a ticket reservation to a ticket reservation system of an airline company or the like from an intranet (an in-house communication network) including an in-house agency system and a plurality of personal computers (hereinafter referred to as "PCs") connected with each other by, for example, a local area network (hereinafter referred to as a "LAN").

2. Description of the Related Art

A large company makes an agency contract with an airline company, a railway company or the like so that the in-house agency is equipped with ticket booking and issuing terminals for issuing tickets in order for their employees to arrange tickets which are necessary for their business trip.

FIG. 2 is a diagram illustrating an example of a process flow of a plane ticket booking operation in an in-house travel agency according to a prior art.

As shown in FIG. 2, an in-house travel agency is equipped with a ticket booking and issuing terminal as well as a fare adjustment processing system. The ticket booking and issuing terminal has a printer for issuing plane tickets in addition to a keyboard and a display for input operations, and is on-line-connected to a ticket reservation system of an airline company via a dedicated line. The fare adjustment processing system may be a computer for processing a fare adjustment, which has an input device for inputting data and an output device for outputting a bill or the like as the processing result. Circled numerals in FIG. 2 indicate the order of the booking operation flow. The process flow of a plane ticket booking operation will now be described referring to FIG. 2.

① An in-house user who wants to buy plane tickets, first, notify the in-house travel agency of the following information by phone, facsimile or the like to apply for booking and issuing plane tickets.

a) Ticket booking and issuing information such as departure date and time, a destination and requested flight numbers.

b) Purchaser information such as the affiliation and the name of the applicant.

c) Cost processing information such as items of expenditure.

② An operator of the in-house travel agency enters the ticket booking and issuing information notified from the in-house user by the keyboard of the ticket booking and issuing terminal.

③ The ticket booking and issuing information entered into the terminal is sent to the ticket reservation system to book tickets.

④ The result of the ticket booking is sent from the reservation system to be displayed, and the booked tickets are outputted from the printer.

⑤ The operator inputs from the input device of the fare adjustment processing system the information on the sum of fares or the like shown on the display in addition to the purchaser information and the cost processing information notified from the in-house user.

⑥ The tickets outputted from the printer are sent to the purchaser.

⑦ The amount of money for the purchased tickets or the like is calculated in a predetermined interval in the fare adjustment processing system to issue a bill, which is sent to the purchaser.

⑧ The purchaser confirms the bill and asks the accounting department to pay for the bill by phone, facsimile or the like.

A conventional in-house ticket booking operation, however, is complicated in the purchasing procedure, because an operator is involved in sending and receiving data for booking. On the other hand, as the Internet develops, more and more PCs with an Internet connection capability have been introduced in-house and also, in airline companies or transportation companies like railroad companies, functions of a ticket reservation system have been expanded so that the ticket booking requests can be accepted via the Internet. However, even if tickets are booked via the Internet, the problem of a complicated purchase procedure hasn't yet been solved, because only a travel agency or the like can issue tickets or receive the payment for the fares.

OBJECT AND SUMMARY OF THE INVENTION

The present invention solves the aforementioned problem, and provides a ticket booking and issuing method and system wherein plane tickets or the like can be easily booked and issued through an in-house agency system connected to an intranet.

To solve the above mentioned problem, the first aspect of the present invention provides a ticket booking and issuing method of a ticket booking and issuing system including a reservation system for accepting ticket booking requests via a communication line, a local computer being interconnected to the reservation system via the communication line to issue the tickets booked in the reservation system, and a personal computer being interconnected to the local computer via a network and being equipped with an Internet connection function, which comprises the steps of addressing a ticket booking commencement request to the local computer from the personal computer, sending information relating to the reservation system and address information of the reservation system from the local computer to the personal computer via the network in accordance with the ticket booking commencement request, storing the information sent from the local computer into a memory for displaying the information relating to the reservation system on a screen for selection in the personal computer; reading out the address of the reservation system that is selected on the screen for selection from the memory for connecting to the selected reservation system via the Internet in the personal computer, transmitting and receiving information including a booking number via Internet between the personal computer and the selected reservation system, generating booking data by compiling predetermined data within the information transmitted and received in the transmitting and receiving step into a predetermined form and sending the generated booking data to the local computer via the network in the personal computer, and transmitting data including the booking number within the booking data to the selected reservation system via the communication line for issuing the tickets booked in the reservation system in the local computer.

The second aspect of the present invention provides a ticket booking and issuing system including a reservation system for accepting ticket booking requests via a communication line, a local computer being interconnected to the reservation system via the communication line to issue the tickets booked in the reservation system, and a personal computer being interconnected to the local computer via a network and being equipped with an Internet connection function, which comprises addressing means for addressing a ticket booking commencement request to the local computer from the personal computer, sending means for sending information relating to the reservation system and address information of the reservation system from the local computer to the personal computer via the network in accordance with the ticket booking commencement request, storing means for storing the information sent from the local computer into a memory for displaying the information relating to the reservation system on a screen for selection in the personal computer, reading means for reading out the address of the reservation system that is selected on the screen for selection from the memory for connecting to the selected reservation system via the Internet in the personal computer, transmitting and receiving means for transmitting and receiving information including a booking number via Internet between the personal computer and the selected reservation system, generating means for generating booking data by compiling predetermined data within the information transmitted and received in the transmitting and receiving step into a predetermined form and sending the generated booking data to the local computer via the network in the personal computer, and transmitting means for transmitting data including the booking number within the booking data to the selected reservation system via the communication line for issuing the tickets booked in the reservation system in the local computer.

According to the present invention, the following processes are performed in a ticket booking and issuing system.

When a ticket booking commencement request is addressed from a PC, information data on the names of ticket reservation systems and their Internet addresses is sent from the local computer to the PC through a LAN. The names of the reservation systems are displayed on the PC display for selection. When a ticket reservation system is selected on the display, the is connected to the selected reservation system via the Internet.

After the ticket booking process is carried out according to a ticket booking procedure in the reservation system, a predetermined data within the information sent and received through the booking process is compiled as ticket booking data into a certain form to be sent to the local computer through the LAN. In the local computer, necessary data such as a ticket booking number within the ticket booking data is sent to the reservation system via a dedicated line to issue the tickets booked in the ticket reservation system.

BRIEF DESCRIPTION OF THE DRAWINGS

FIG. 4 is a diagram illustrating an example of a "Ticket Booking Process Screen" displayed on the PC 30; and FIG. 5 is a diagram illustrating an example of a "Ticket Issuing Process Screen" displayed on the PC 30.

DETAILED DESCRIPTION OF THE PREFERRED EMBODIMENTS

Figure 1:
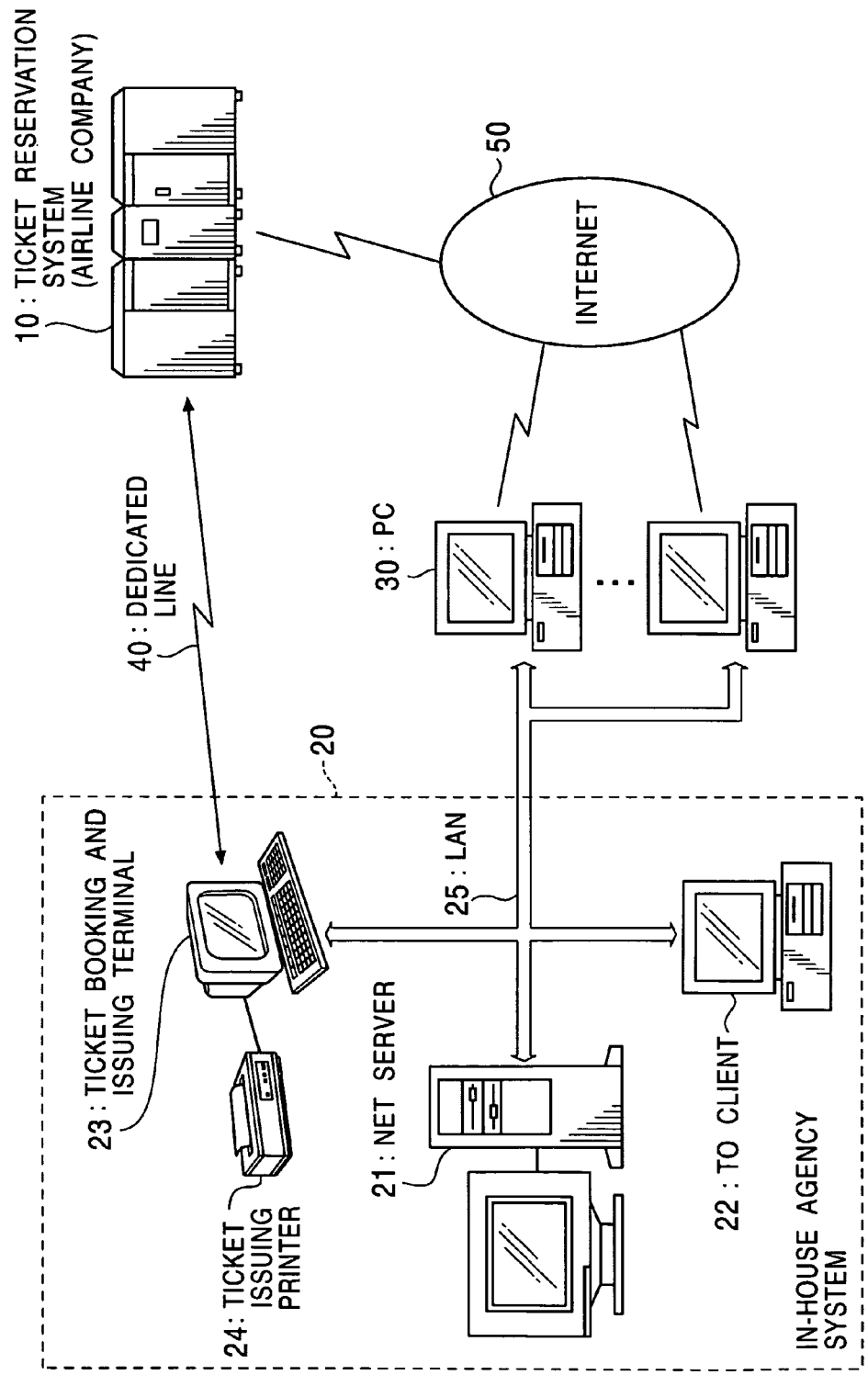
FIG. 1 is a diagram illustrating a configuration of a ticket booking and issuing system according to an embodiment of the present invention.
Figure 2:
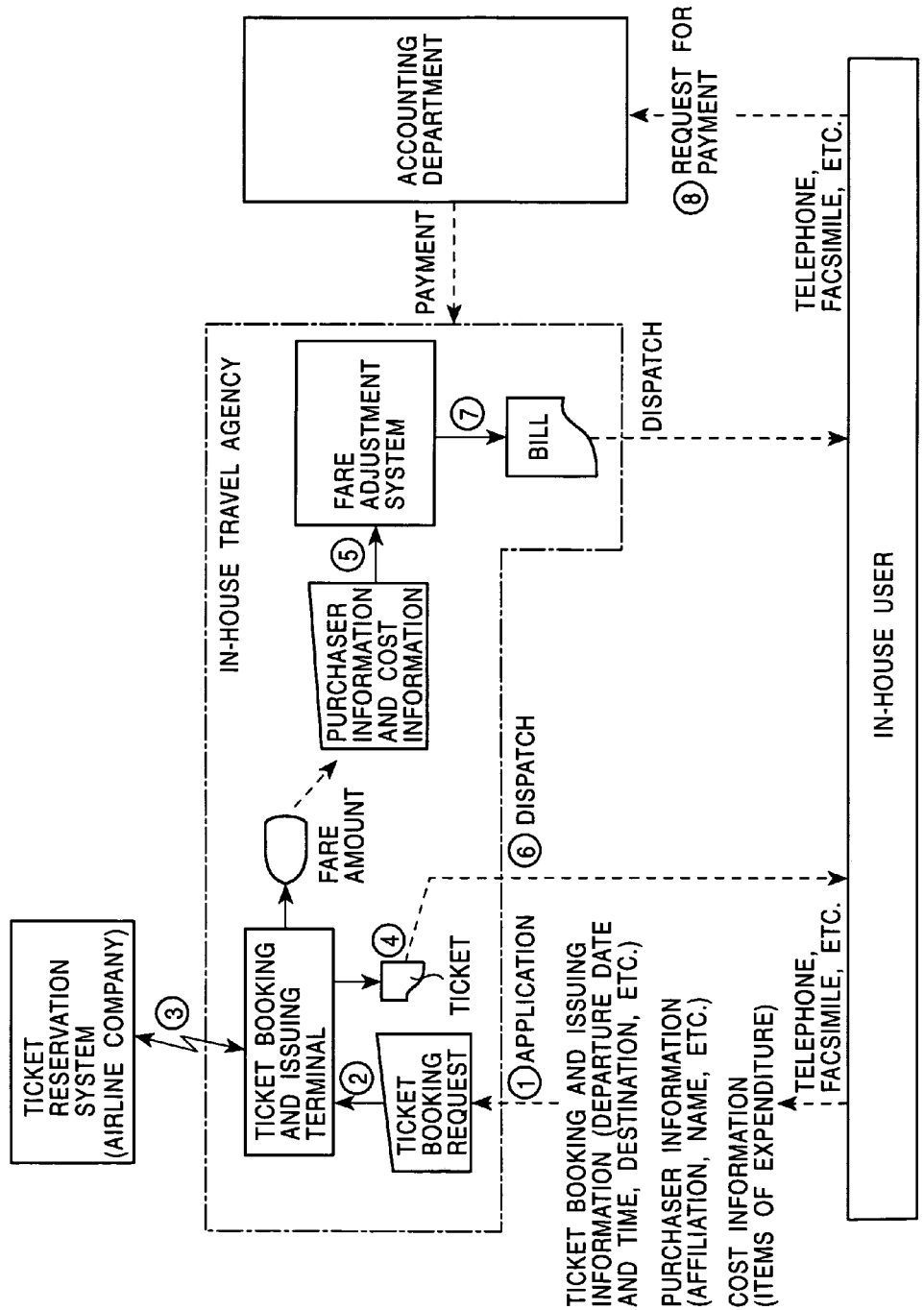
FIG. 2 is a diagram illustrating an example of an operation flow of plane ticket booking operation in a conventional in-house travel agency.

FIG. 1 is a diagram illustrating a configuration of a system for booking and issuing tickets (e.g., plane tickets) according to an embodiment of the present invention.

The ticket booking and issuing system includes a ticket reservation system 10 of an airline company, a local computer 20 owned by a company which issues plane tickets by making an agency contract with the airline company (e.g., an in-house agency system) and a plurality of PCs 30 arranged within the at company.

The in-house agency system 20 has a configuration including a net server 21 which is equipped with a data base and which controls the whole system, a client 22 which is a terminal placed within the agency, one or more ticket booking and issuing terminal(s) 23 and ticket issuing printer(s) 24 connected to each other via a LAN 25. A plurality of PCs 30 arranged in-house are connected to the LAN 25.

The ticket booking and issuing terminal(s) 23 is (are) connected to the corresponding ticket reservation system 10 through a dedicated line 40 for the reservation system 10 to carry out booking of the plane ticket and to print out and issue the tickets which have been booked from the ticket issuing printer 24.

The PCs 30 are connected to the in-house agency system 20 via the LAN 25 and can be connected to the Internet 50. And the reservation system 10 is also connected to the ticket booking and issuing terminal 23 (which may be called simply the "issuing terminal" for the sake of brevity of the in-house agency system 20 via the dedicated line 40, and has a function of accepting booking requests for plane tickets from the PC or the like via the Internet 50.

Figure 3:
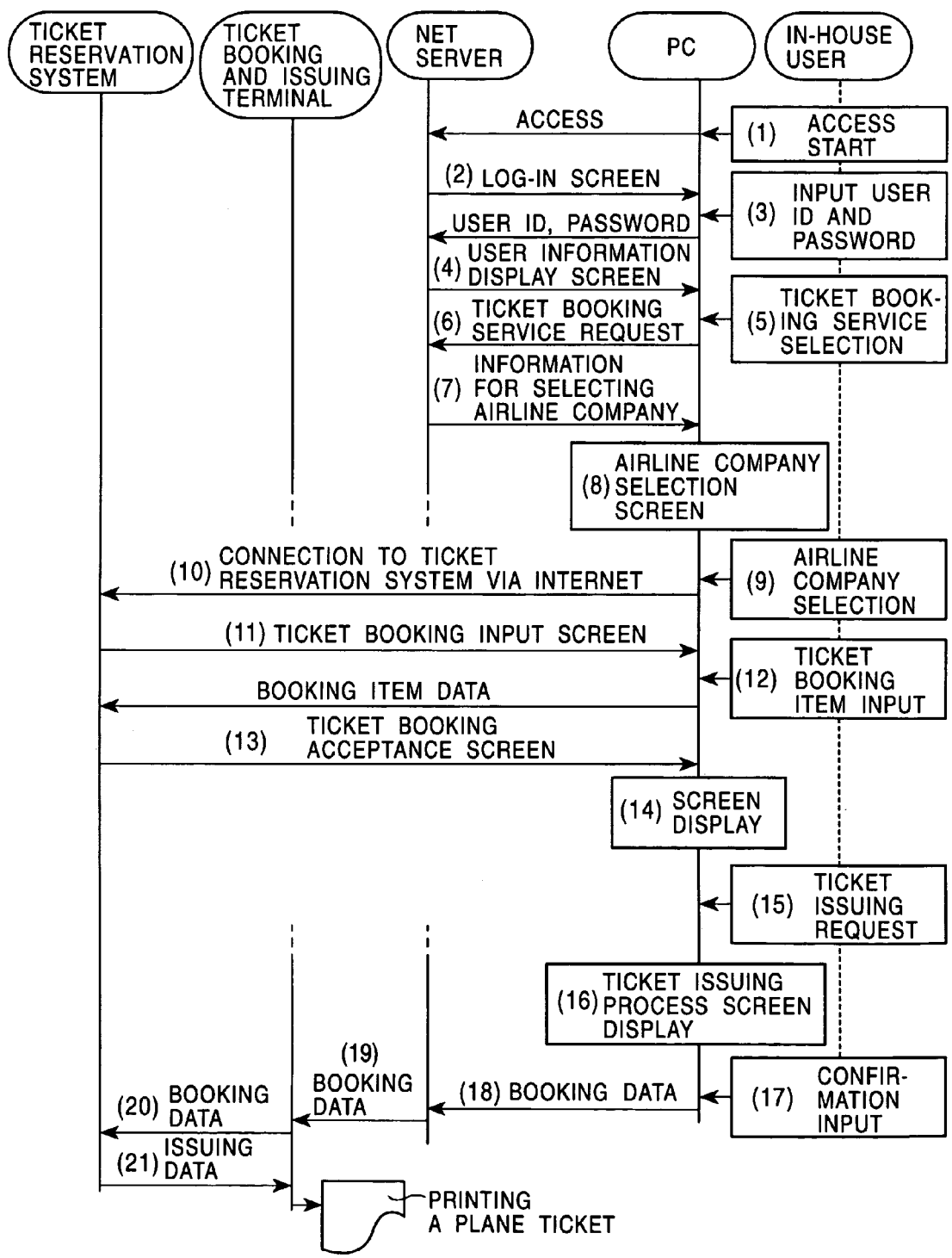
FIG. 3 is a diagram illustrating a procedure of a booking and issuing process for plane tickets in the ticket booking and issuing system in FIG. 1.

FIG. 3 is a diagram illustrating a procedure of a plane ticket booking and issuing process performed in the ticket booking and issuing system shown in FIG. 1. FIG. 4 is a diagram showing an example of a screen displayed on the PC 30 for a ticket booking process, and FIG. 5 is a diagram showing an example of a screen displayed on the PC 30 for a ticket issuing process.

Referring to FIG. 3 through FIG. 5, the process flow of a plane ticket booking and issuing method in the ticket booking and issuing system of FIG. 1 is described in accordance with the following (1)-(21) in sequence.

(1) An in-house user uses the PC 30 to make an access to the in-house agency system 20 via the LAN 25. Here, the in-house user is in advance registered with the in-house agency system 20 and is given a user ID (identification code) and a password for the user.

(2) A "Log-in Screen" is sent from the net server 21 in the in-house agency system 20 via the LAN 25 to be displayed on the display device of the PC 30.

(3) The in-house user enters the user ID and the password to be sent to the net server 21 according to the prompts appeared in the "Log-in Screen" displayed on the display of the PC 30.

(4) In the net server 21, the user ID and the password received from the PC 30 are checked to see if they represent the regular in-house user registered in a "personal information management table". If the validity of the ID and the password is verified, the corresponding "User Information Screen" is sent according to the "user flag" in the "personal information management table". The "User Information Screen" indicates the service menu which is available to the registered in-house users.

(5) The in-house user follows the "User Information Screen" displayed on the PC 30 to select a service he/she wants to use (here, a plane ticket booking service) [the first process].

(6) The plane ticket booking service request selected on the "User Information Screen" of the PC display is sent to the net server 21 via the LAN 25.

(7) In the net server 21, when the plane ticket booking service request is received, information for selecting an airline company is sent to the PC 30 [the second process]. The airline selection information includes the correspondence information between the names of the airline companies and their Internet addresses (i.e., home page addresses for accepting a booking of an airline company). Each of the airline companies has made an agency contract with the in-house agency and is available for a booking via the Internet.

(8) In the PC 30, the received information for selecting an airline company is once stored in a memory. In addition, on the basis of the information, names of the airline companies are displayed in an "Airline Company Selection Screen" [the third process]. The upper left frame in FIG. 4 shows an example of the "Airline Company Selection Screen".

(9) The in-house user follows the "Airline Company Selection Screen" displayed on the PC 30 to select an airline company (here, e.g. A airlines) he/she wants to use.

(10) In the PC 30, when a specific airline company (here, A airlines) is selected on the "Airline Company Selection Screen", based on the information stored in the memory, a home page address for accepting a booking for the A airlines is read out from the memory. And in accordance with the read home page address, a connection is established to the reservation system 10 of the A airlines via the Internet 50 [the fourth process].

(11) When the PC 30 is connected to the reservation system 10 via the Internet 50, a "Ticket Booking Input Screen" is sent from the reservation system 10. The "Ticket Booking Input Screen" may, for example, be displayed in the upper right frame of PC 30.

(12) The in-house user follows the "Ticket Booking Input Screen" displayed on the PC 30 to input necessary data of ticket booking items such as a departure date and time, flight numbers, names, which are sent to the reservation system 10.

(13) In the reservation system 10, it is determined if received booking request is acceptable or not. If it is acceptable, the "Ticket Booking Acceptance Screen" including the accepted items and the acceptance number is sent from the reservation system 10 to the PC 30 via the Internet 50 [the fifth process].

(14) When the "Ticket Booking Acceptance Screen" is received from the reservation system 10 on the PC 30, the "Ticket Booking Acceptance Screen" is displayed in the upper right frame on the PC screen as shown in FIG. 4, and a "Ticket Issue Request Screen" is displayed in the lower frame.

(15) The in-house user confirms the "Ticket Booking Acceptance Screen" displayed on the PC 30 and makes a request for the issue of the tickets in accordance with the "Ticket Issue Request Screen" when the user finds no mistakes in the displayed "Ticket Booking Acceptance Screen".

(16) In the PC 30, when a ticket issue request is inputted in accordance with the "Ticket Issue Request Screen", the booking data including the names, the acceptance number, the flight dates and flight numbers inputted in the "Ticket Booking Acceptance Screen" is compiled. The resultant data, for example, is displayed in a "Ticket Issuing Process Screen" as shown in FIG. 5.

(17) The in-house user confirms the data appeared in the "Ticket Issuing Process Screen" displayed on the PC 30 and, if necessary, adds the time when the plane tickets should be delivered and then inputs for confirmation.

(18) In the PC 30, when ticket issue request is made in accordance with the "Ticket Issuing Process Screen", the ticket booking data is compiled into a certain form to be sent to the net server 21 via the LAN 25 [the sixth process].

(19) In the net server 21, the ticket booking data is converted into a Hypertext Markup Language (HTML) which is able to be linked with other resources, and is stored as data for a fare adjustment process. In addition, the ticket booking data including the acceptance number for plane tickets or the like is sent to the ticket booking and issuing terminal 23 from the net server 21 via the LAN 25.

(20) In the ticket booking and issuing terminal 23, when the booking data is given from the net server 21, such items as the acceptance number for plane tickets are sent to the reservation system 10 via the dedicated line 40 to carry out a plane ticket issuing process [the seventh process].

(21) When ticket issuing data is sent from the reservation system 10 to the ticket booking and issuing terminal 23 via the dedicated line 40, the plane tickets are printed out from the ticket issuing printer 24 attached to the ticket booking and issuing terminal 23.

As described above, the ticket booking and issuing system according to the embodiment has the following advantages (i) through (v).

(i) The net server 21 sends information for selecting an airline company including the names of airline companies and their Internet addresses to the PC 30. Thus the in-house user is able to have an access to a ticket reservation system of an airline company to book plane tickets only by selecting the airline company the user wishes to use.

(ii) The booking data is sent to the net server 21 from the PC 30 through the LAN 25, and further, is given to the booking and issuing terminal 23, therefore, input operation for issuing plane tickets becomes unnecessary.

(iii) The booking data is sent to the net server 21 from the PC 30 through the LAN 25, to be stored as data for a fare adjustment process in the net server 21, therefore input operation for a fare adjustment process or the like becomes unnecessary.

(iv) The in-house users themselves can book via the Internet 50 without involving an operator of the in-house agency in between, therefore, ticket booking mistakes or the like are eliminated.

(v) The booking data are stored in the net server 21, and therefore, can be utilized for analyzing client information or the like.

The present invention is not limited to the above-mentioned embodiment, and can be modified in a variety of ways. Such examples of modifications are, for example, presented in the following (a)-(e).

(a) Though the description refers to the system connected to the reservation system 10 of airline companies to book and issue plane tickets, the present invention can be applied to a various reservation system such as a railway ticket reservation system and an event ticket reservation system.

(b) The connection link between the in-house agency system 20 and the PC 30 is not limited to the LAN 25, but any types of communication links can be employed.

(c) The connection link between the reservation system 10 and the ticket booking and issuing terminal 23 is not limited to the dedicated line 40, but a public telephone links or the like can be applicable in the same way.

(d) The "Ticket Booking Process Screen" or the "Ticket Issuing Process Screen" displayed on the PC 30 are not limited to the forms shown in FIG. 4 and FIG. 5.

(e) The net server 21 or the PC 30 are not necessarily dedicated to ticket bookings, and may be used for other optional operations at the same time.

As described above in detail, according to the present invention, in the forth process, on the basis of an Internet address corresponding to a reservation system selected on the selection screen displayed on a user PC, a connection to the reservation system via the Internet is established. In the sixth process, then, ticket-booking data is generated from the information data communicated between the reservation system and the PC in the fifth process, and is sent from the reservation system to a local computer through a LAN. Thus, consistent operation from issuing a ticket to a fare adjustment process can be realized, since data input operation on the local computer becomes unnecessary.

The present invention has been described with reference to the preferred embodiment thereof. It should be understood by those skilled in the art that a variety of alternations and modifications may be made from the embodiment described above. It is therefore contemplated that the appended claims encompass all such alternations and modifications.

What is claimed is:

1. A booking and issuing method of an intranet ticket booking and issuing system including a net server and an issuing terminal interconnected to said net server via a local area network, said issuing terminal being interconnected to external reservation systems which accept ticket booking requests via at least one communication line, and a personal computer being interconnected to said net server via said local area network and having an Internet connection function, comprising:

a booking step for making a booking from said personal computer to one of said external reservation systems, said booking step including:

addressing a user's ticket booking commencement request to said net server from said personal computer;

sending home page addresses of said external reservation systems from said net server to said personal computer via said local area network in accordance with said ticket booking commencement request;

storing, in said personal computer, the home page addresses sent from said net server into a memory and displaying information corresponding to the home page addresses relating to said external reservation systems on a screen for selection by the user;

receiving, in said personal computer, a selection of one of said external reservation systems by the user and reading out the home page address of the selected external reservation system from said memory;

connecting said personal computer to a website of the selected external reservation system via the Internet and displaying a reservation screen of a web site provided by the selected external reservation system;

completing, without the aid of said net server, a booking through said website provided by the selected external reservation system, between said personal computer and the selected external reservation system, by transmitting and receiving information data including a booking number via the Internet; and generating, in said personal computer, booking data of a predetermined format by compiling predetermined data included in the information data and sending the booking data of the predetermined format to said net server via said local network, the booking data of the predetermined format including the booking number; and an issuance step for issuing a booked ticket by said issuing terminal, said issuance step including:

receiving, in said net server, the booking data of the predetermined format;

storing a received booking data in said net server, and sending said booking number included in the received booking data to said issuing terminal from said net server;

transmitting said booking number from said issuing terminal to the selected external reservation system via said at least one communication line, and receiving, in said issuing terminal, ticket issuing data from the selected external reservation system to issue the ticket booked in the selected external reservation system.

2. A ticket booking and issuing system including a plurality of external reservation systems for accepting ticket booking requests via at least one communication line, a net server and an issuing terminal interconnected to said net server via a local area network, said issuing terminal being interconnected to said external reservation systems via said at least one communication line and a personal computer interconnected to said net server via said local area network and having an Internet connection function, comprising:

addressing means for addressing a user's ticket booking commencement request to said net server from said personal computer;

sending means for sending home page addresses of said reservation systems from said net server to said personal computer via said local network in accordance with said ticket booking commencement request;

storing means for storing, in said personal computer, the home page addresses sent from said net server;

display means for displaying information corresponding to the home page addresses on a screen for selection by the user;

receiving means for receiving, in said personal computer, a selection of one of the external reservation systems by the user and for reading out of said from said storage means the home page address of the selected external reservation system;

transmitting and receiving means for connecting said personal computer to a website provided by the selected external reservation system and displaying a reservation screen thereof on said display means, and for transmitting and receiving information data including a booking number via the Internet between said personal computer and the selected external reservation system to complete, without the aid of said net server, a booking through said website provided by the selected external reservation system between said personal computer and the selected external reservation system;

generating means for generating, in said personal computer, booking data of a predetermined format by compiling predetermined data within the information data transmitted and received in said transmitting and receiving means into a predetermined form and sending the booking data of the predetermined format to said net server via said local area network, the booking data of the predetermined format including the booking number;

means, provided in said net server, for storing a received booking data and for sending said booking number included in the received booking data to said issuing terminal;

means for transmitting, upon receiving said booking number included in the booking data from said net server to the selected external reservation system via said at least one communication line; and means, provided in said issuing terminal, for receiving ticket issuing data from the selected external reservation and for issuing the ticket booked in said the selected external reservation system.

3. A booking and issuing method according to claim 1, further comprising:

converting, in said net server, the booking data received from said personal computer into data of a predetermined hypertext language to generate data for fare adjustment; and storing the data for fare adjustment in said net server.

4. A booking and issuing system according to claim 2, further comprising:

a converter provided in said net server for converting the booking data received from said personal computer into data of a predetermined hypertext language to generate data for fare adjustment; and a memory provided in said net server for storing the data for fare adjustment.

5. A booking and issuing method according to claim 1, further comprising:

a step of receiving instructions for the predetermined data format, wherein the generating step generates, in response to the instructions, booking data of a common data-format using data displayed on the reservation screen of the selected external reservation system and sends the booking data of the common data-format to said net server via said local area network, the common data-format being a data-format common to computers connected to said local area network.

6. A booking and issuing system according to claim 2, further comprising:

a step of receiving instructions for the predetermined data format, wherein the generating means generates, in response to the instructions, booking data of a common data-format using data displayed on the reservation screen of the selected external reservation system and sends the booking data of the common data-format to said net server via said local area network, the common data-format being a data-format common to computers connected to said local area network.

* * * * *